Patented Dec. 3, 1940

2,223,949

UNITED STATES PATENT OFFICE 2,223,949

SORBITOL BORATES AND SALTS THEREOF

Clarence Bremer, Tamaqua, Pa., assignor to Atlas Powder Company, Wilmington, Del., a corporation of Delaware No Drawing. Application April 5, 1938, Serial No. 200,127

6 Claims. (Cl. 260—462)

This invention relates to new sorbitol borates and alkali metal salts thereof.

An object of this invention is the production of water soluble condensation products of sorbitol with boric acid or alkali metal (including ammonium) salts of boric acid, or with mixtures of boric acid and alkali metal hydroxide.

A further object of the invention is the production of such compounds which are resinous in appearance.

A further object of the invention is the production of water soluble derivatives of sorbitol in which the hydrogen atom of at least one secondary alcohol group has been replaced with a boron radical selected from that group of radicals represented by —BRR'; —BR'R², where R is OH or OM, M being an alkali metal, R' is a bond to the oxygen atom and replaces the hydrogen atom of another secondary alcohol group of the sorbitol and R² is a bond to the oxygen atom and replaces the hydrogen atom of a third alcohol group of the sorbitol.

A further object of the invention is the production of such compounds which contain a neutralizing alkali, which are free from crystallizing tendencies when dissolved in water, and which are substantially neutral.

A still further object of the invention is the production of new and superior borates which are suitable for use as coating compositions for paper and textiles; as conditioning agents for paper and textiles; ingredients in cosmetics and hair waving compounds; ingredients in electrolytic condensers; ingredients in pharmaceutical preparations and adhesives, and for many other uses where adhesiveness, relatively high viscosity, good electrical conductivity and hygroscopicity are desirable.

Reaction products of boric acid and other polyhydric alcohols, principally glycol and glycerine, have been prepared and used extensively in the arts. The reaction product of boric acid and glycerol is exemplary, and in such a product condensation takes place on the first and second carbon atoms of the glycerol, thereby involving one primary and one secondary alcohol group as shown by the following formula:

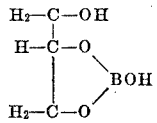

I have found that I can produce sorbitol borates and alkali metal salts thereof wihch have many advantages over glycerol borate. The products of this invention hydrolyze, upon dissolution in water, to sorbitol and boric acid, and differ thus from mannitol and dulcitol borates which do not hydrolyze in this manner. Sorbitol borates are useful for many purposes to which the other polyhydric alcohol borates are not suited. Thus, many of the sorbitol borates are hygroscopic, and for this reason are excellent conditioning agents.

In this specification, where pH of a product is referred to, there is meant the pH of a 25% aqueous solution prepared by dissolving 25 parts by weight of the product in 75 parts by weight of water.

The straight boric acid-sorbitol condensation products are acidic in character and have a pH of about 2. The acidic products can be neutralized or made basic in character as desired by the addition thereto of alkalies, such as ammonium hydroxide, ammonia, sodium hydroxide, potassium hydroxide, etc.; or the required amount of an alkali metal borate can be substituted for boric acid in the reaction mixture, thereby leading directly to the production of materials of the desired pH. The addition of sufficient alkali to convert about 80% of the borate molecules to the corresponding alkali salt will produce a neutral product of pH 7, whereas the addition of sufficient alkali to convert all of the boric acid molecules to the corresponding alkali salt results in a product of pH value of about 10.4. For example, a neutral monoborate product (pH of 7.0) may be prepared by reacting one mol of sorbitol and one mol of boric acid and adding to the resinous melt 0.8 mol of sodium hydroxide per mol of sorbitol. However, if one mol of sodium hydroxide is added to the resinous melt, the pH will be 10.4, which is the pH value of the sodium sorbitol borate. A neutral diborate product of pH 7 may be prepared by reacting one mol of sorbitol and two mols of boric acid and adding to the resinous melt 1.5 mols of sodium hydroxide per mol of sorbitol which is equivalent to 0.75 mol of sodium hydroxide per atom of boron. If two mols of sodium hydroxide are added to this resinous melt, the pH will be 10.4.

The products obtained by neutralizing acid sorbitol borates with sodium hydroxide are very desirable since they do not hydrolyze in or crystallize out of aqueous solution. In the preparation of these products it is convenient to heat the correct quantities of sorbitol and boric acid at 110–120° C. until two molecules of water of condensation have been volatilized. The reaction mixture is then cooled to a temperature below 100° C. and 50% NaOH solution is added with stirring until a pH of 7 is reached. The pH should not exceed 7 if the product is to be heated, since even faintly alkaline products tend to discolor greatly if heated any length of time. The water introduced by neutralization is evaporated by heating at 100–120° C. in an oven or in other manner which insures uniform distribution of heat throughout the entire mass. The time consumed for this evaporation varies inversely with the pH, that is, the higher the pH the shorter should be the time of heating, and will usually be from ½ to 2 hours. The sodium salt of acid sorbitol borate is more water soluble than acid sorbitol borate itself and moreover does not hydrolyze in or crystallize from its aqueous solutions.

Clear, resin-like products may be obtained by reacting one mol of sorbitol with one or two mols of boric acid. The reaction of mol for mol ratios results in the production of sorbitol monoborate, whereas the reaction of one mol of sorbitol with two mols of boric acid results in the formation of sorbitol diborates.

In the preparation of these borates, the ingredients are preferably dissolved in a relatively large amount of water, say from 4 to 12 mols of water per mol of sorbitol present in the reaction mixture. The use of large proportions of water in the reaction mixture is advantageous since the water serves as a vehicle and facilitates mixing and reaction of the ingredients. The mixture thus obtained is then heated at a temperature of 110 to 120° C. for a sufficient period of time to drive off the water which must be removed to form the desired condensation product. Thus, with a mixture of one mol of sorbitol, one mol of boric acid and 10 mols of water, removal from the reaction mixture of about 12 mols of water results in the production of the monoborate dicondensation product. While it is preferable to carry out the reaction between the sorbitol and the boric acid or alkali metal borate in the presence of an excess of water, it is to be understood that where the mixed melting point is below the charring point of the ingredients, the water of solution may be reduced in amount or eliminated.

In the preparation of sorbitol borates having a pH value above 2, I find it preferable to react the sorbitol and the boric acid first and to add at the end of the reaction the amount of alkali metal hydroxide required to adjust the melt to the desired pH. When the alkali metal hydroxide is added to the reaction mixture after the reaction between the sorbitol and the boric acid is substantially complete, it is more effective than when it is added at the beginning, especially if the sorbitol borate melt is permitted to cool to about 100° C. before addition of the alkali metal hydroxide. Products of pH value of from above 2 and up to 10 comprise a mixture of the alkalized and the non-alkalized sorbitol borate.

However, the preparation of sorbitol borates having a pH above 2 is not to be considered as limited in this respect. The alkali metal hydroxide may be employed as a starting material in the reaction mixture if so desired, or the alkali metal salts of boric acid such as ammonium borate, sodium metaborate, sodium tetraborate, sodium perborate, potassium metaborate, lithium metaborate, lithium tetraborate, and the like, may be employed as a starting material in place of all or part of the boric acid. If desired, the ingredients may be reacted in amounts which will result in a product of a pH value above that desired so that final adjustment of pH value can be made downwardly with boric acid. Such downward adjustment of pH value may result in the presence of unreacted boric acid.

Consequently, the invention is not to be considered as limited with respect to the pH value of the product, nor with respect to the manner of obtaining the desired pH value in the products. While in the following description of the various embodiments of the invention, the acidic products have been chosen for purposes of illustration, it is to be understood that an alkali metal may be substituted for one or more of the unreacted hydrogen atoms of the boric acid radical of the reaction product without departing from the invention.

In reacting equimolecular quantities of sorbitol and boric acid, I find that the first condensation takes place involving two secondary hydroxyl groups and loss of two molecules of water. Further condensation takes place involving one additional hydroxyl group, upon another molecule of water being volatilized during the reaction.

For example, when one mol of sorbitol and one mol of boric acid are reacted, according to my process, until 2 mols of water have been volatilized, a clear, resin-like, sorbitol monoborate dicondensation product is obtained. The structure of this product has been determined to be—

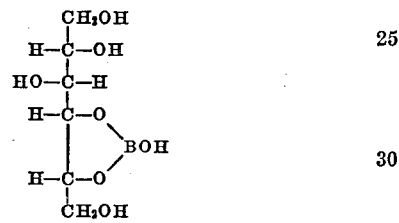

by acetylation, tritylation, combustion analysis, and molecular weight.

If such a reaction be continued until 3 mols of water have been volatilized, a clear, resin-like tricondensation product is obtained. The structure of the tricondensation product is similar to that of the dicondensation product in that at least two secondary alcohol groups of the sorbitol are involved in the condensation. However, an additional molecule of water is eliminated so that the boric acid is condensed with three instead of two alcohol groups of the sorbitol. It is not known positively whether the third condensation takes place upon a primary or a secondary alcohol group, although the evidence points to the latter.

The diborate, tetracondensation products of sorbitol may be prepared by reacting one mol of sorbitol with 2 mols of boric acid until 4 mols of water have been removed. Again condensation takes place between the secondary alcohol groups of the sorbitol and the boric acid, and no primary alcohol groups of the sorbitol are involved in the condensation. The structure of the diborate of sorbitol, as confirmed by combustion analysis, acetylation and tritylation, may be written as follows:

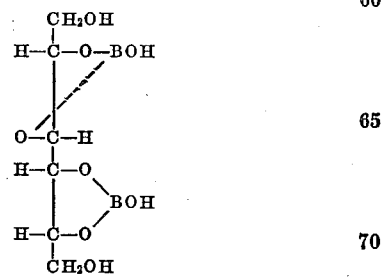

The sorbitol used may be either in the form of pure, crystalline, solid sorbitol or in the form of a technical aqueous sorbitol syrup containing in addition to sorbitol, other polyhydric alcohols such as desoxy hexitols, e. g. saccharitols, desoxy pentitols, and related polyhydric bodies which are not polyhydric alcohols such as the anhydro derivatives of the hexahydric alcohols, relatively small amounts of ash, unreduced sugar, organic acids, etc. and produced by the reduction of glucose, invert sugar or the like. If desired, sorbitol syrup which has been de-ashed by suitable methods may be used.

In the following non-limiting examples of various embodiments of the invention and their preparation, the reaction products of 1 mol of sorbitol and 1 mol of boric acid are designated as monoborates and the reaction products of 1 mol of sorbitol and 2 mols of boric acid are designated as diborates. Where the product was neutralized or partially neutralized, the example specifies the cation used and the pH to which the product was adjusted. The borates are designated further by the terms indicating the degree of condensation. Thus, where two mols of water are lost during the reaction, the product is termed a dicondensation product; where four mols of water are lost during the reaction, the product is termed a tetracondensation product, etc. The viscosities, where given, were determined using a Hoeppler viscosimeter.

EXAMPLE 1

*Sorbitol monoborate — Acidic — Dicondensation product*

182 g. (1 mol) of crystalline sorbitol and 62 g. (1 mol) of boric acid were mixed with 180 g. of water. The mixture was heated at 110-115° C. until the water of solution and 2 mols of water of condensation had been volatilized. A clear resinous melt was formed. The product has a pH of 2.0 and an index of refraction of about 1.48, and had four free hydroxyls as determined by acetin number. Tritylation showed the two primary alcohol groups to be open. Combustion analysis showed the empirical formula to be $C_6H_{13}O_7B$. The product was solid at room temperature and had a viscosity of 43,500 centipoises at 200° F. When the product was dissolved in water at 10%, 25%, 50% and 75% concentrations, hydrolysis resulted. When the solutions thus obtained were cooled to 0° C., precipitation of free boric acid occurred.

EXAMPLE 2

*Ammonium sorbitol monoborate—pH 7.0—Dicondensation product*

The ingredients were mixed in the same proportions and accorded the same treatment as in Example 1. After 2 mols of water of condensation had been volatilized, the melt was cooled to 100° C. Then ammonia water containing 28% of ammonia was added until a pH of 7.0 was obtained. Approximately 1.4 mols of $NH_3$ were required due to the loss of part of the ammonia by volatilization. The additional water introduced by neutralization was driven off by heating which was carried out in an oven at approximately 100-120° C. to insure uniform distribution of heat throughout the entire mass. A determination of the acetin number showed 4.0 free hydroxyls in the product. The product was liquid at room temperature and had a viscosity of 2,360 centipoises at 200° F. When the product was dissolved in water at 10%, 25%, 50% and 75% concentrations and the solutions thus obtained were cooled to 0° C., a precipitate of free boric acid was obtained in the case of the 50% concentration only.

EXAMPLE 3

*Ammonium sorbitol monoborate—pH 8.5—Dicondensation product*

The ingredients were mixed in the same proportions as in Example 1, and were subjected to the same initial treatment. After 2 mols of water of condensation had been driven off, the melt was cooled to 100° C. Ammonia water containing 28% of ammonia was added until a pH of 8.5 was obtained. Approximately 1.8 mols of $NH_3$ were required, due to the loss of part of the ammonia by volatilization. The additional water introduced by neutralization was driven off by heating as in Example 2. A determination of the acetin number showed 4.0 free hydroxyls. When the product was dissolved in water to form solutions of 10%, 25%, 50% and 75% concentrations, and the solutions thus obtained were cooled to 0° C., no precipitate was obtained in any of the concentrations.

EXAMPLE 4

*Ammonium sorbitol monoborate—pH 10.4—Dicondensation product*

The ingredients were mixed in exactly the same proportions as in Example 1. After 2 mols of water of condensation had been driven off, the melt was cooled to 100° C. Ammonia water containing 28% of ammonia was added until a pH of 10.4 was obtained. Approximately 2.2 mols of $NH_3$ were required, due to the loss of part of the ammonia by volatilization. The additional water introduced by neutralization was driven off by heating as in Example 2. A determination of the acetin number of the product showed 4.0 free hydroxyls. When the product was dissolved in water at 10%, 25%, 50% and 75% concentrations and the solutions obtained were cooled to 0° C., no precipitate was obtained in any of the concentrations.

EXAMPLE 5

*Sodium sorbitol monoborate—pH 7.0—Dicondensation product*

The ingredients were mixed in exactly the same proportions as in Example 1. After 2 mols of water of condensation had been volatilized, the melt was cooled to a temperature below 100° C. Then a 50% solution of sodium hydroxide was added until a pH of 7.0 was obtained. Exactly .8 mol of sodium hydroxide was required. The additional water introduced by neutralization was volatilized by heating in an oven at 100-120° C. to insure uniform distribution of heat. The acetin number showed 4.0 free hydroxyls. The product was extremely viscous at room temperature and even at 200° F. its viscosity was too high for measurement. When the product was dissolved in water at 10%, 25%, 50% and 75% concentrations, and the resulting solutions were cooled to 0° C., a precipitate of free boric acid was obtained in the 50% concentration only.

EXAMPLE 6

*Sodium sorbitol monoborate—pH 8.5—Dicondensation product*

The ingredients were mixed in exactly the same proportions as in Example 1, and were subjected to the same treatment. After two mols of water of condensation had been driven off, the melt was cooled below 100° C. Then a 50% solution of sodium hydroxide was added until a pH of 8.5 was obtained. Exactly .9 mol of sodium hydroxide was required. The additional water introduced by neutralization was volatilized by heating in an oven at 100-120° C. to insure uniform distribution of heat throughout the entire mass. A determination of the acetin number showed 4.0 free hydroxyls. The product was extremely viscous at room temperature, and even at 200° F. its viscosity was too high for measurement. When the product was dissolved in water at 10%, 25%, 50% and 75% concentrations, and the solutions were cooled to 0° C., no precipitate was obtained in any concentration.

EXAMPLE 7

*Sodium sorbitol monoborate—pH 10.4—Dicondensation product*

The ingredients were mixed in exactly the same proportions and subjected to the same treatment as in Example 1. After 2 mols of water of condensation had been driven off, the melt was cooled to a temperature below 100° C. Then a 50% solution of sodium hydroxide was added until a pH of 10.4 was obtained. Exactly 1 mol of sodium hydroxide was required. The additional water introduced by neutralization was volatilized by heating in an oven at 100-120° C. to insure uniform distribution of heat throughout the entire mass. A determination of the acetin number showed 4.0 free hydroxyls. The product was extremely viscous at room temperature and even at 200° F. its viscosity was too high for measurement. When the product was dissolved in water at 10%, 25%, 50% and 75% concentrations, and the solutions were cooled to 0° C., no precipitate was obtained in any concentration.

EXAMPLE 8

*Sodium sorbitol monoborate—pH 10.4—Dicondensation product*

91 gms. (0.5 mol) of crystalline sorbitol and 47.7 gms. (0.125 mol) of sodium tetraborate ($Na_2B_4O_7 \cdot 10H_2O$) were dissolved in 100 gms. of water. This mixture was heated at 100-120° C. until all of the water of solution as well as 1 mol of water of condensation had been driven off. The final heating was carried out in an oven at 100-120° C. to insure uniform distribution of heat throughout the entire mass. The clear resinous melt had a pH of 10.4 and contained 4.0 free hydroxyls as ascertained by acetin determination. The product was extremely viscous at room temperature, and even at 200° F. its viscosity was too high for measurement. When dissolved in water, it showed no hydrolysis or precipitation of boric acid in any concentration.

EXAMPLE 9

*Sorbitol diborate—Acidic—Tetracondensation product*

182 g. (1 mol) of crystalline sorbitol and 124 g. (2.0 mols) of boric acid were mixed with 125 ml. of water. The mixture was heated at 110-115° C. until all of the water of solution and 2 mols of water of condensation had volatilized. A clear resinous melt having a pH of 2.0 was obtained. A determination of the acetin number showed that two hydroxyls were free while tritylation showed that two primary alcohol groups were open. Combustion analysis showed an empirical formula of $C_6H_{12}O_8B_2$. The product was solid at room temperature. At 200° F. its viscosity was too high to be measured. When the product was dissolved in water at 10%, 25%, 50% and 75% concentrations, and the solutions were cooled to 0° C., free boric acid crystallized out in every case.

EXAMPLE 10

*Sodium sorbitol diborate—pH 7.0—Tetracondensation product*

The ingredients were mixed in the same proportion and treated in the same manner as in Example 9. After 4 mols of water of condensation had been driven off, the melt was cooled to 100° C. Then 1.5 mols of sodium hydroxide were added in the form of a 50% solution, after which the additional water was driven off by heating in an oven at 100-120° C. in order to insure uniform distribution of heat throughout the entire mass. The product showed a pH of 7.0 and had two free hydroxyls as determined by the acetin number. At room temperature the product was extremely viscous and at 200° F. its viscosity was too high for measurement. When it was dissolved in water in 10%, 25%, 50% and 75% concentrations, and the solutions were cooled to 0° C., a precipitate of free boric acid was obtained in the 25% and 50% concentrations.

EXAMPLE 11

*Ammonium sorbitol diborate—pH 7.0—Tetracondensation product*

The ingredients were mixed in the same proportions and subjected to the same treatment as in Example 9. After 4 mols of water of condensation had been volatilized, the melt was cooled to 100° C. Then ammonia water containing 28% $NH_3$ was added until a pH of 7.0 was reached. This required 200 ml. of the ammonia water, essentially 2.8 mols. The mass was then heated to remove the additional water introduced by neutralization. During the heating, some of the ammonia was lost. The acetin number of the product showed 2.0 free hydroxyls. When the product was dissolved in water to 10%, 25%, 50% and 75% concentrations, and the solutions were cooled to 0° C., a precipitate of free boric acid was obtained in every case.

EXAMPLE 12

*Sorbitol monoborate—Acidic—Dicondensation product*

45.5 gms. (.25 mol) of crystalline sorbitol and 15.5 grams of boric acid (.25 mol) were mixed in the cold, in the dry form. No water or medium of any kind was added. The dry mixture was then placed in an oven maintained at 130° C. When the temperature of the mixture had reached 75° C. it began to melt. At 105° C. water of condensation was evolved. The mixture lost 9.1 grams of water which was equivalent to 2 mols of water per mol of sorbitol. A clear resin was obtained having a pH of 2.0 as measured in a 25% solution in water. No boric acid crystallized out at this dilution at room temperature. The product was the same as that produced in Example 1.

It is to be understood that many modifications may be made in the above examples without departing from the spirit of the invention as defined in the appended claims. Thus, a lower temperature than that specified may be employed, provided a longer time is utilized. Or, the reaction may be carried out at higher temperatures, say up to 140° C., or higher, with a shorter time, provided objectionable color is not developed. Thus, suitable amounts of alkali may be added at the beginning of the reaction instead of at the end. While stirring is contemplated in each of the above examples, it may be dispensed with under certain conditions. If desired, an inert gas such as carbon dioxide may be passed through or over the reacting mixture, although the preferred temperatures given in the examples are so low that this precaution is generally unnecessary. The reaction is in general conducted at the temperature at which water of condensation is split off and eliminated by boiling. For instance, it may be conducted either at 85° C. at 100 mm. pressure with boiling, or at 100° C. at atmospheric pressure, with boiling, or, as shown above, it may be conducted at temperatures above 100° C. at which boiling readily occurs. These and other modifications of the invention will be readily apparent to those skilled in the art.

Some of the sorbitol borates and salts thereof contemplated by this invention display excellent electrical conductivity. The resistance at 25° C. of aqueous solutions of several of the sorbitol borates of the invention were as follows:

*Resistance—Ohms/cubic centimeter*

| Product | pH | Concentration of aqueous solution | | | | |
| --- | --- | --- | --- | --- | --- | --- |
| | | 100% | 95% | 90% | 85% | 80% |
| Sorbitol monoborate acidic | 2.0 | 8,000,000 | 750,000 | 200,000 | 50,000 | 35,000 |
| Ammonium sorbitol monoborate | 7.0 | 2,000 | 1,500 | 1,050 | 800 | 970 |
| Sodium sorbitol monoborate | 7.0 | 10,000 | 7,000 | 3,100 | 1,700 | 1,450 |

Solutions of electrolyte made from sorbitol borates of low resistance may be made more concentrated and therefore more viscous and with less tendency to flow or leak, with the same conductivity. However, the invention is not to be considered as limited to borates having particular electrical properties, since the borates of the invention have great utility in many arts where their electrical properties are of little or no importance.

Having described my invention, what I claim is:

1. A water soluble derivative of sorbitol in which the hydrogen atom of a secondary alcohol group has been replaced with a boron radical selected from that group of radicals represented by —BRR'; —BR'R², where R is selected from the group consisting of OH and OM, M being an alkali metal, R' is a bond to the oxygen atom and replaces the hydrogen atom of another secondary alcohol group of the sorbitol, and R² is a bond to the oxygen atom and replaces the hydrogen atom of a third alcohol group of the sorbitol.

2. A water soluble derivative of sorbitol, in which the hydrogen atom of a secondary alcohol group has been replaced with the boron radical —BRR', where R is selected from the group consisting of OH and OM, M being an alkali metal, and R' is a bond to the oxygen atom and replaces the hydrogen atom of another secondary alcohol group of the sorbitol.

3. Sorbitol monoborate dicondensation product of the following formula:

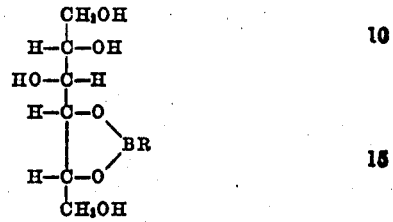

where R is selected from the group consisting of OH and OM, M being an alkali metal.

4. Sorbitol monoborate dicondensation product of the following formula:

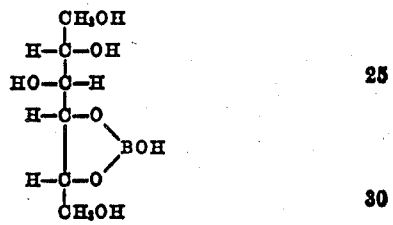

5. Sorbitol diborate tetracondensation product of the following formula:

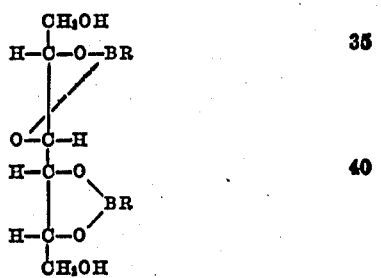

where R is selected from the group consisting of OH and OM, M being an alkali metal.

6. Sorbitol diborate tetracondensation product of the following formula:

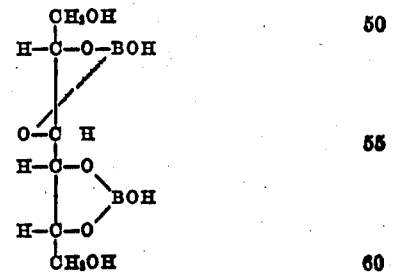

CLARENCE BREMER.